US010535142B2

(12) United States Patent
Kim et al.

(10) Patent No.: US 10,535,142 B2
(45) Date of Patent: Jan. 14, 2020

(54) METHOD AND APPARATUS FOR ACCELERATING FOREGROUND AND BACKGROUND SEPARATION IN OBJECT DETECTION USING STEREO CAMERA

(71) Applicant: Electronics and Telecommunications Research Institute, Daejeon (KR)

(72) Inventors: Kwang Yong Kim, Daegu (KR); Jang Woon Baek, Daegu (KR); Yun Su Chung, Daegu (KR); Yun Won Choi, Daegu (KR)

(73) Assignee: ELECTRONICS AND TELECOMMUNICATION RESEARCH INSTITUTE, Daejeon (KR)

( * ) Notice: Subject to any disclaimer, the term of this patent is extended or adjusted under 35 U.S.C. 154(b) by 69 days.

(21) Appl. No.: 15/864,279

(22) Filed: Jan. 8, 2018

(65) Prior Publication Data

US 2018/0197295 A1 Jul. 12, 2018

(30) Foreign Application Priority Data

Jan. 10, 2017 (KR) .......................... 10-2017-0003469
Sep. 19, 2017 (KR) .......................... 10-2017-0120575

(51) Int. Cl.
*G06K 9/00* (2006.01)
*G06T 7/194* (2017.01)
(Continued)

(52) U.S. Cl.
CPC ................ *G06T 7/194* (2017.01); *G06T 7/12* (2017.01); *G06T 7/13* (2017.01); *G06T 7/136* (2017.01);
(Continued)

(58) Field of Classification Search
CPC . G06T 2207/10012; G06T 2207/10028; G06T 2207/20076; G06T 2207/30261;
(Continued)

(56) References Cited

U.S. PATENT DOCUMENTS 8,548,229 B2 10/2013 Badino et al.
2010/0158387 A1 6/2010 Choi et al.
(Continued)

OTHER PUBLICATIONS

Hernan Badino et al., "Free Space Computation Using Stochastic Occupancy Grids and Dynamic Programming"; Workshop on Dynamical Vision, ICCV, Rio de Janeiro, Brazil, Oct. 20, 2007, pp. 1-12.

*Primary Examiner* — Xin Jia
(74) *Attorney, Agent, or Firm* — Kile Park Reed & Houtteman PLLC

(57) ABSTRACT

Provided is a method of separating a foreground and a background by extracting a depth image through a stereo camera, generating an occupancy grid map on the basis of the depth image, predicting a free space, and computing a membership value, the method including setting a threshold value of a foreground object existing in a free space boundary region of the predicted free space, determining whether the membership value reaches the threshold value of the foreground object while the membership value is computed, terminating the computing of the membership value when it is determined that the membership value being computed reaches the threshold value of the foreground object in the determining, and separating a foreground and a background through the computed membership value.

12 Claims, 9 Drawing Sheets

FREESPACE.

(51) Int. Cl.
  *G06T 7/136* (2017.01)
  *G06T 7/60* (2017.01)
  *G06T 7/12* (2017.01)
  *G06T 7/143* (2017.01)
  *G06T 7/13* (2017.01)

(52) U.S. Cl.
  CPC ................ *G06T 7/143* (2017.01); *G06T 7/60* (2013.01); *G06T 2207/10012* (2013.01); *G06T 2207/10028* (2013.01); *G06T 2207/20076* (2013.01)

(58) Field of Classification Search
  CPC .. G06T 7/12; G06T 7/13; G06T 7/136; G06T 7/143; G06T 7/194; G06T 7/593; G06T 7/60
  See application file for complete search history.

(56) References Cited

U.S. PATENT DOCUMENTS

| | | | |
|---|---|---|---|
| 2011/0142343 A1 | 6/2011 | Kim et al. | |
| 2014/0071240 A1* | 3/2014 | Chen | G06T 7/70 348/46 |
| 2015/0213624 A1* | 7/2015 | Lee | G06T 7/194 382/103 |
| 2017/0032194 A1* | 2/2017 | Yu | G06K 9/00771 |
| 2018/0005048 A1* | 1/2018 | Ding | G06K 9/00335 |

\* cited by examiner

POLAR OCCUPANCY GRID.

CORRESPONDING FREE SPACE IN WORLD COORDINATES.

SEGMENTATION RESULT.

FREESPACE.

METHOD AND APPARATUS FOR ACCELERATING FOREGROUND AND BACKGROUND SEPARATION IN OBJECT DETECTION USING STEREO CAMERA

CROSS-REFERENCE TO RELATED APPLICATION

This application claims priority to and the benefit of Korean Patent Application No. 2017-0003469, filed on Jan. 10, 2017, and 2017-0120575, filed on Sep. 19, 2017, the disclosure of which is incorporated herein by reference in its entirety.

BACKGROUND

1. Field of the Invention

The present invention relates to a method and apparatus for accelerating foreground and background separation in objection detection using a stereo camera, and more particularly, to a method and apparatus for accelerating foreground and background separation using occupancy grid information according to a prior probability distribution.

2. Discussion of Related Art

According to a conventional technique, in order to detect an object using a stereo camera, various foreground and background separation techniques have been presented. Among the techniques, the "Stixel World" scheme developed by Daimler is widely used The Stixel World scheme employs a method of checking for a free space and segmenting a region having a depth value (a distance value) similar to that of a free space boundary region as a foreground.

In more detail, to segment a similar region, membership values are assigned and accumulated in a vertical direction from the free space boundary region, and the first maximum value of the accumulated values is set as a foreground threshold region.

However, the conventional technique needs to compute all accumulated values of a corresponding region in the vertical direction so that the amount of computation of foreground/background detection is large.

SUMMARY OF THE INVENTION

The present invention is directed to providing a method and apparatus capable of accelerating background and object separation using occupancy grid information according to a prior probability distribution when separating a foreground and a background in a road region detection scheme.

The present invention is directed to providing a method and apparatus capable of reducing an amount of membership computation for separating a background and an object by setting a threshold value of the object in a free space boundary region on the basis of a prior probability information value constituting an occupancy grid map and computing a membership value on the basis of the threshold value of the object in a height segmentation stage of the object.

The technical objectives of the present invention are not limited to the above disclosure, and other objectives may become apparent to those of ordinary skill in the art based on the following descriptions.

According to one aspect of the present invention, there is provided a method for accelerating foreground/background separation in object detection using a stereo camera when separating a foreground and a background by extracting a depth image through the stereo camera, generating an occupancy grid map on the basis of the depth image, predicting a free space, and computing a membership value, the method including: setting a threshold value of a foreground object existing in a free space boundary region of the predicted free space; determining whether the membership value reaches the threshold value of the foreground object while the membership value is computed; terminating the computing of the membership value when it is determined that the membership value being computed reaches the threshold value of the foreground object in the determining; and separating a foreground and a background through the computed membership value.

According to another aspect of the present invention, there is provided an apparatus for accelerating foreground/background separation in object detection using a stereo camera, the apparatus including: a pair of stereo cameras configured to capture an image; an occupancy grid map generator configured to extract a depth image from the image captured through the stereo cameras and generate an occupancy grid map on the basis of the depth image; a free space processor configured to predict a free space from the generated occupancy grid map; a threshold value setter configured to set a threshold value of a foreground object which is used to terminate a computation of a membership value; a membership computer configured to compute a membership value of the image; a membership determiner configured to determine whether the membership value reaches the threshold value of the foreground object while the membership value is computed; a membership controller configured to terminate the computation of the membership value when it is determined that the membership value being computed reaches the threshold value of the foreground object in the determination; and a separator configured to separate a foreground and a background through the computed membership value.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

The above and other advantages, features, and a scheme for the advantages of the present invention will become readily apparent with reference to the following detailed description when considered in conjunction with the accompanying drawings.

However, the scope of the present invention is not limited to such embodiments, and the present invention may be realized in various forms. The embodiments to be described below are only embodiments provided to complete the disclosure of the present invention and assist those skilled in the art to completely understand the objective, construction, and effects of the present invention. The present invention is defined only by the scope of the appended claims.

Meanwhile, the terms used herein are used to aid in the explanation and understanding of the present invention and are not intended to limit the scope spirit of the present invention. It should be understood that the singular forms "a," "an," and "the" also include the plural forms unless the context clearly dictates otherwise. The terms "comprises," "comprising," "includes," and/or "including," when used herein, specify the presence of stated features, integers, steps, operations, elements, components and/or groups thereof, and do not preclude the presence or addition of one or more other features, integers, steps, operations, elements, components, and/or groups thereof.

Before describing the embodiments of the present invention, a conventional object detection scheme will be described for the sake of the understanding of those skilled in the art, and then acceleration of background/object separation using a prior probability distribution value of occupancy grid information according to the embodiments of the present invention will be described.

There have been various developments of object detection schemes using a stereo camera in a conventional advanced driver assistance system (ADAS) for a vehicle, and among the schemes, a Stixel-based object detection method, which was devised by Daimler, is widely used.

Hereinafter, the conventional Stixel-based object detection scheme will be described with reference to FIG. 1.

Figure 1:
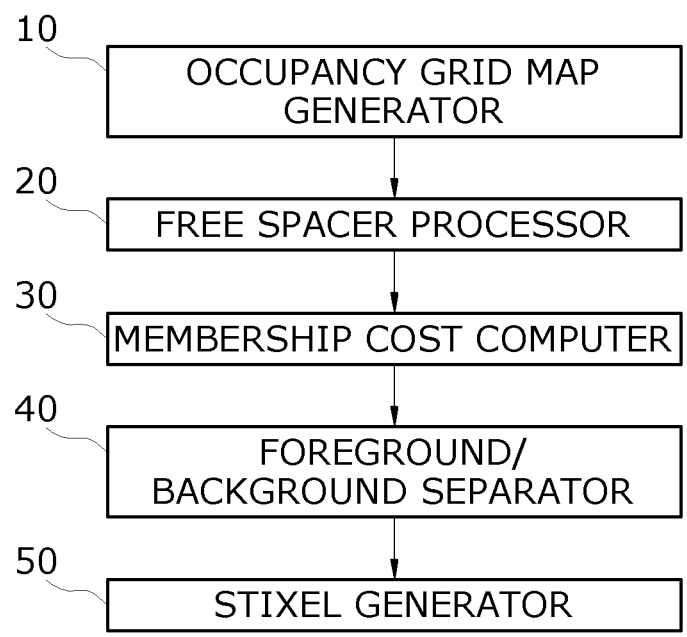
FIG. 1 is a functional block diagram for explaining a Stixel object detection apparatus according to conventional technology.

FIG. 1 is a schematic flowchart showing a stereo camera-based object detection method according to conventional technology. Referring to FIG. 1, the conventional Stixel-based object detection method includes extracting a depth image by using a stereo camera, and generating, by an occupancy grid map generator 10, a probability-based occupancy grid map on the basis of the extracted depth image.

The occupancy grid is provided by dividing the surface of the Earth in a world coordinate system into grid type cells and computing a grid likelihood value $L_{ij}$ for each of the cells. Accordingly, the occupancy grid defines a grid, which corresponds to a measurement value represented as a depth image, as an occupancy likelihood.

This may be expressed as Equation 1 below.

$$D(i, j) = \sum_{k=1}^{} L_{ij}(m_k), \; m_k = (u, v, d)^T \quad \text{[Equation 1]}$$

Herein, D(i,j) is an occupancy grid value, i is a lateral component, j is a depth component, $L_{ij}$ is an occupancy likelihood value, $m_k$ is a measurement value, u and v are image coordinates, d refers to a disparity value, and T refers to a value for reversing positions of a column and a row in a matrix.

Figure 6A:
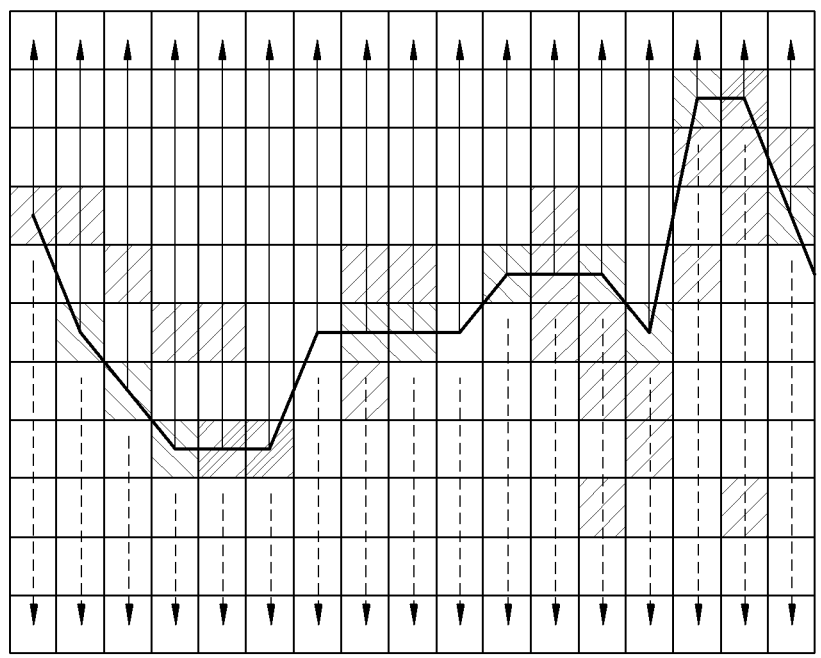
FIG. 6A to FIG. 6D is a reference view for explaining stages of a process according to an embodiment of the present invention; and FIG. 7A to FIG. 7C is a reference view for explaining a process for setting a threshold value of a foreground object according to an embodiment of the present invention.

Meanwhile, the occupancy grid representation is divided into a Cartesian Occupancy Grid, Column/Disparity Occupancy Grid and a Polar Occupancy Grid depending on a method of representing a lateral interval and a longitudinal interval thereof. Among these, the Polar Occupancy Grid, which is expressed in Equation 2 below, is the most widely used as an object extraction method for a vehicle. By using the Polar Occupancy Grid, every column may be searched in a simple manner, as shown in FIG. 6A.

Polar Occupancy Grid: $L_{ij}(m_k)=G_{m_k}((u_{ij}-u,0d'_{ij}-d)^T)$ [Equation 2]

D(i,j) is an occupancy grid value, $L_{ij}$ is an occupancy likelihood value, $G_{mk}$ is a multi-variate Gaussian function, u and v are image coordinates, d refers to a disparity value, and T refers to a value for reversing positions of a column and a row in a matrix.

The multi-variate Gaussian $G_{mk}$ may be expressed as a probability value, as shown Equation 3, so that a universal lossless multi-variate Gaussian is provided.

$$G_{m_k}(\varepsilon_k) = \frac{1}{(2\pi)^{3/2}|\Gamma_k|}\exp\left(-\frac{1}{2}\varepsilon_k^T\Gamma_k^{-1}\varepsilon_k\right) \quad \text{[Equation 3]}$$

$G_{mk}$ is a multi-variate Gaussian function, $\Gamma_k$ is an actually measured covariance matrix, $\xi_k$ is a probability value including an error.

Figure 6B:
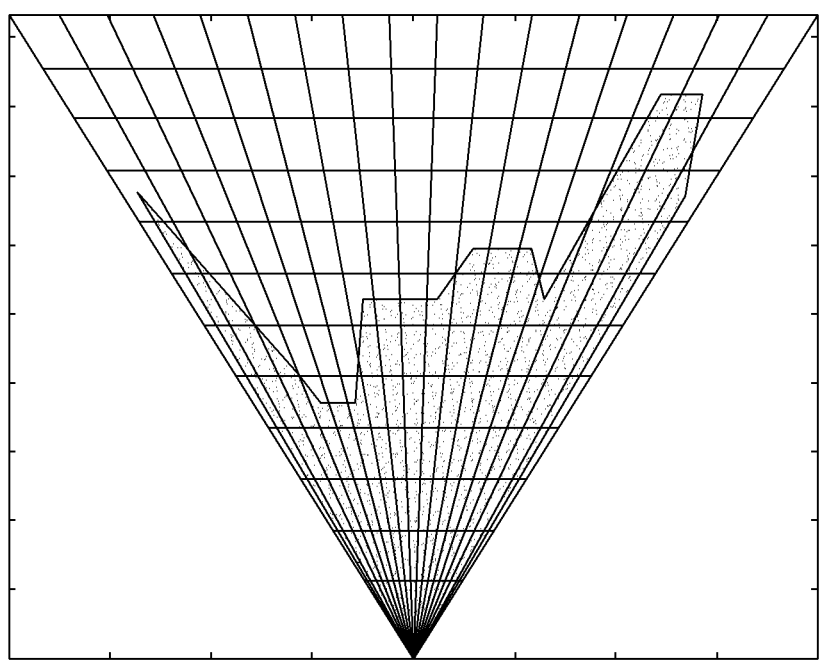

Then, a free space processor 20 performs a process of predicting a free space. That is, in an ADAS technique, a free space refers to a region on a world coordinate system in which a vehicle is able to move without a collision, and according to a conventional technique, the free space is predicted on the occupancy grid map defined above, as shown in FIG. 6B.

A detailed method of predicting a free space is a method of extracting an initially cell occupied in a forward direction of a vehicle, wherein a free space region is extracted by using dynamic programming. The dynamic programming applied to the present invention is a technique disclosed in U.S. Registered patent Ser. No. 08/548,229 (Method for Detecting Objects), and thus a detailed description thereof will be omitted.

Figure 6C:
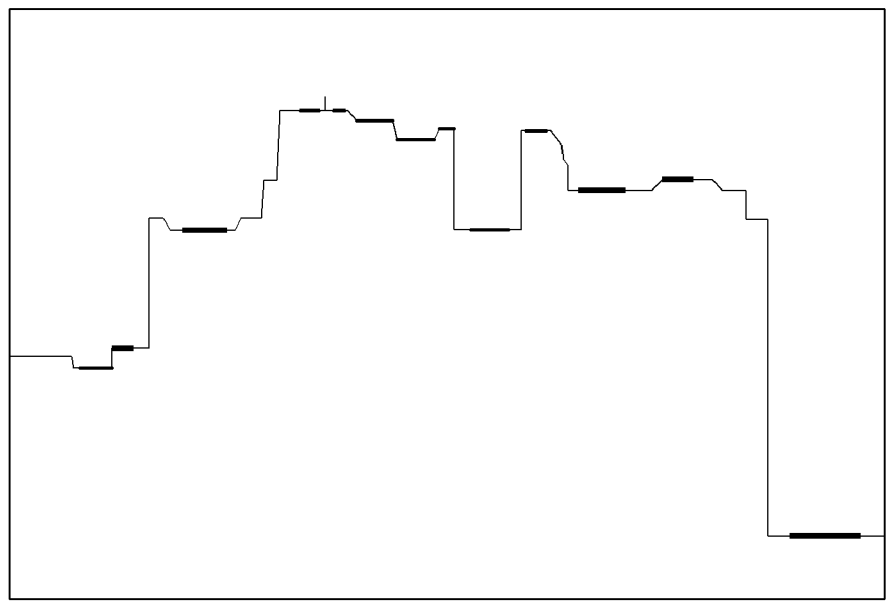

Then, referring to FIG. 6C, a membership cost computer 30 performs a height segmentation of an object adjacent to the predicted free space boundary region. Height segmentation refers to a method of finding an upper boundary of an object on the basis of a free space boundary region to separate a foreground and a background.

Conventional height segmentation extracts an upper boundary value of an object on the basis of a free space boundary region in a depth image according to a result of prediction of a free space. In detail, with respect to the free region boundary region, an object having depth information similar to that of an object boundary region is voted for.

That is, a membership value is set such that, a positive value (+) is indicated unless the membership value deviates from an expected value (a critical value) corresponding to the object by a predetermined maxim distance, and otherwise, a negative value (−) is indicated. This is expressed in Equation 4 below.

$$M(u, v) = m(d_{u,v}) = 2^{\left(1-\left(\frac{d_{u,v}-d_b}{\Delta D_u}\right)^2\right)} - 1 \quad \text{[Equation 4]}$$

Herein, M(u,v) is an accumulated sum value from a free space region v to a boundary region vb of an object.

Figure 6D:
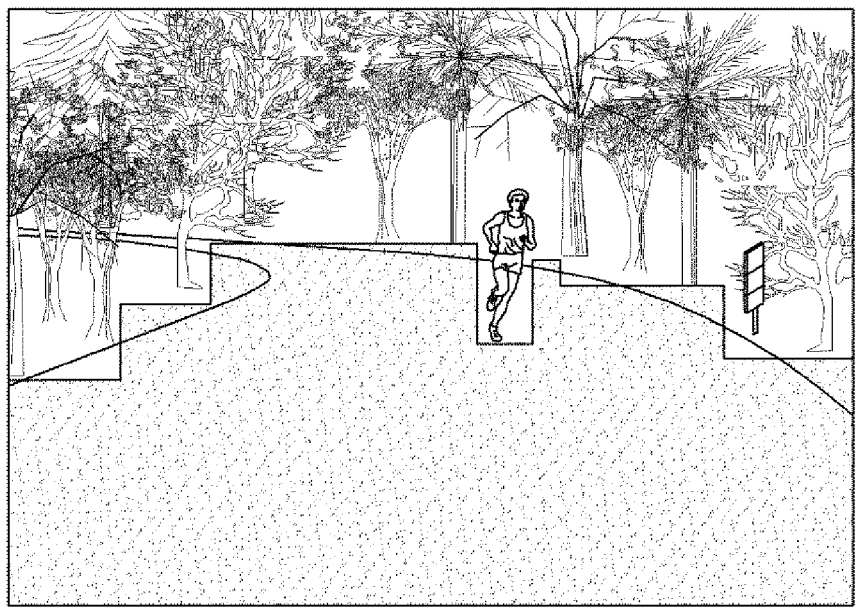

Then, with regard to the object, the membership value computed as above, which is accumulated from the free space boundary region, is computed as an object value. This is expressed in Equation 5 below. In this manner, a free space region is acquired as shown in FIG. 6D.

$$C(u, v) = \sum_{f=v}^{v_b} M(u, f) - \sum_{b=0}^{v-1} M(u, b) \quad \text{[Equation 5]}$$

Herein, C(u,v) is a cost value, M(u,f) is a membership accumulated sum value from a free space boundary region vt to the object boundary region vb, M(u,b) is a membership accumulated sum value from an object boundary region 0 to an end v−1.

Then, a foreground/background separator 40 segments a boundary value with regard to the height of the object by using the dynamic programming again on the basis of the converted cost value.

Finally, a Stixel generator 50 represents the object by defining "Stixel" by expressing the segmented object as stack-form pixels with equal intervals, which are applied to Daimler.

Such a conventional Daimler-based object detection method has the exact accuracy of results in object detection and represents an extracted result in a standardized form, and thus is widely used in an ADAS front monitoring technique using a stereo camera. However, the conventional Daimler-based object detection method has a large amount of computation regarding the dynamic programming and membership value computation.

According to an embodiment of the present invention, in order to improve performance of the above-described conventional technique, a method of efficiently computing a membership value by using prior probability information is suggested.

In the process of generating of the occupancy grid map according to the conventional technology, pixels in a depth image are converted into coordinates on the world coordinate system and an accumulated value of likelihood values to be included in a corresponding grid is assigned as a value assigned to an occupancy grid.

Since pixel values in a depth image mapped to similar world coordinates are accumulated in the same range of occupancy grids, the occupancy grid value provides a hint about depth information of each object.

Accordingly, the present invention suggests a method of setting a threshold value of an object in a free space boundary region on the basis of prior probability information value constituting an occupancy grid map and setting a membership value on the basis of the threshold value in object height segmentation.

Figure 2:
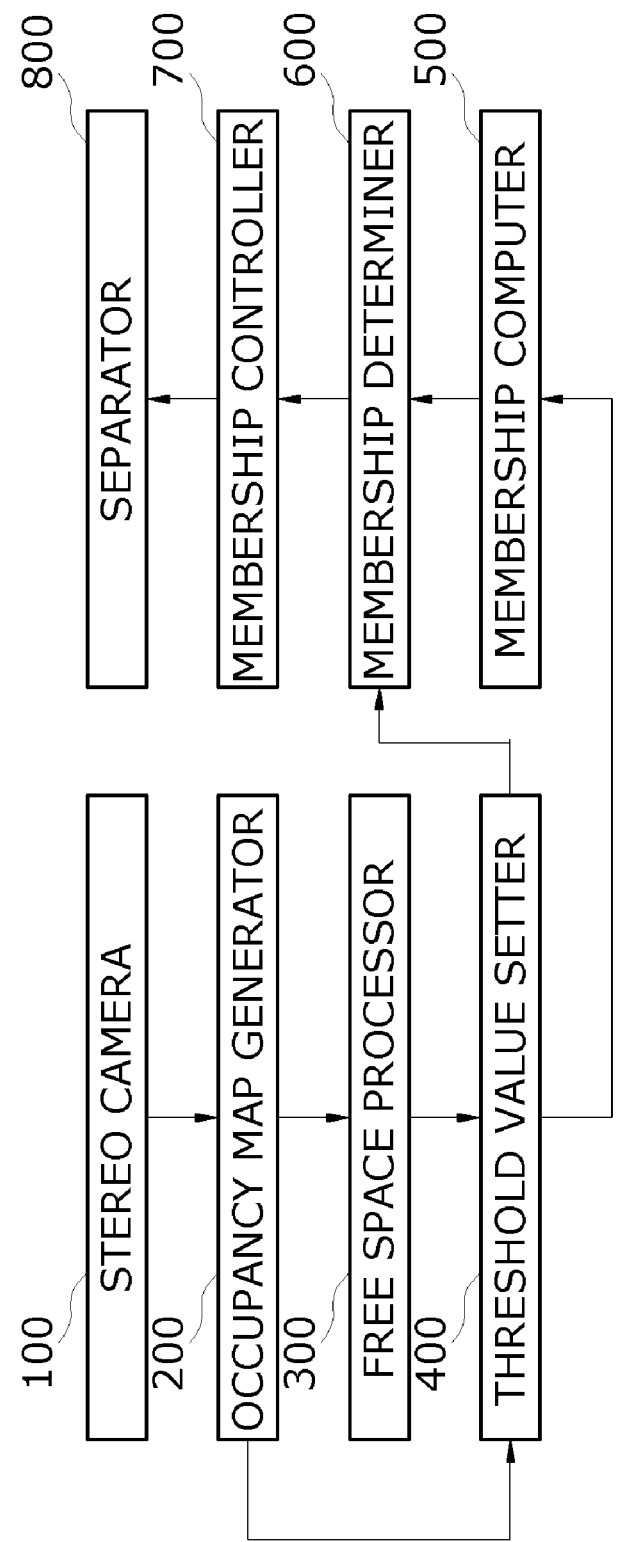
FIG. 2 is a functional block diagram for explaining an apparatus for accelerating foreground/background separation in an object detection method using a stereo camera according to an embodiment of the present invention.

FIG. 2 is a functional block diagram for explaining an apparatus for accelerating foreground/background separation in an object detection method using a stereo camera according to an embodiment of the present invention. Referring to FIG. 2, the apparatus for accelerating foreground/background separation in an object detection method using a stereo camera according to an embodiment of the present invention includes a stereo camera 100, an occupancy grid map generator 200, a free space processor 300, a threshold value setter 400, a membership computer 500, a membership determiner 600, a membership controller 700, and a separator 800.

Figure 7A:

Referring to FIG. 7A, one pair of stereo cameras 100 serve to capture an image of the same region and acquire information corresponding to the image. Preferably, the pair of stereo cameras 100 may be mounted at opposite sides of a front of a vehicle.

Figure 7B:
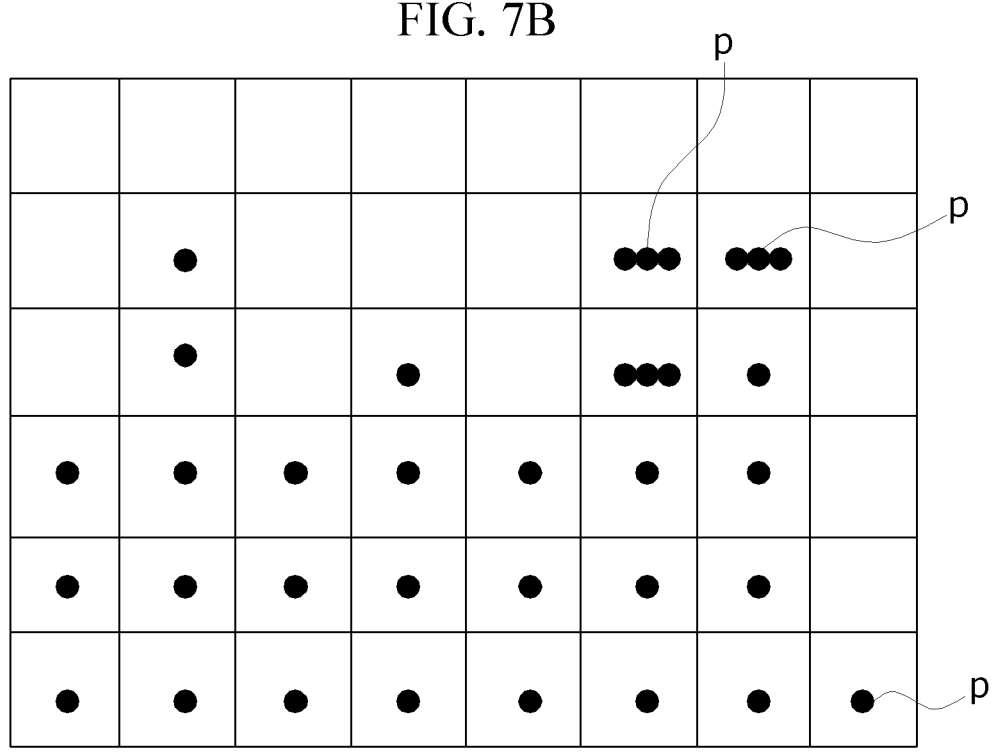

The occupancy grid map generator 200 serves to extract a depth image from the image captured through the stereo cameras 100 and generate an occupancy grid map on the basis of the depth image. Referring to FIG. 7B, the occupancy grid map generator 200 may represent objects as points p on the occupancy grid map.

Figure 7C:
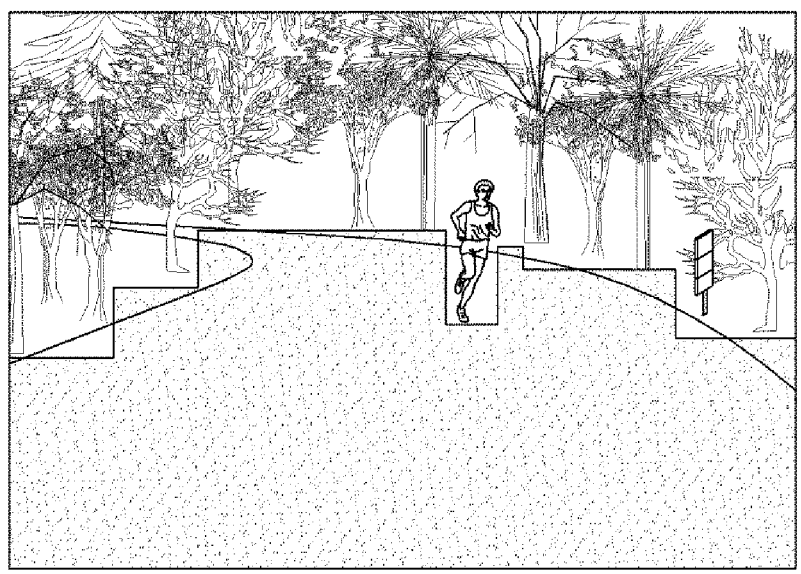

Referring to FIG. 7C, the free space processor 300 serves to predict a free space in the generated occupancy grid map. The method of predicting a free space in the occupancy grid map by the free space processor 300 is a technique generally known in the art, and thus a detailed description thereof will be omitted.

The threshold value setter 400 serves to set a threshold value of a foreground object to prevent a membership value from being computed behind the foreground object when a foreground o and a background b are segmented. As the threshold value of the foreground object is set through the threshold value setter 400 according to the embodiment of the present invention, the amount of membership value processing to be subsequently computed by the membership computer 500 is reduced so that foreground and background separation in the image is accelerated.

In addition, the membership computer 500 serves to compute the membership value of the image.

The membership determiner 600 determines whether the membership value reaches the threshold value of the foreground object while the membership computer 500 computes the membership value.

The membership controller 700 serves to terminate the computation of the membership value being computed when the membership determiner 600 determines that the membership value reaches the threshold value of the foreground object.

According to the embodiment of the present invention, the need for computing the membership value after the threshold value of the foreground object is reached is obviated through the membership computer, the membership determiner, and the membership controller, as shown in Equation 6 below, so that foreground and background separation is accelerated.

$$C(u, v) = \sum_{f=v}^{v_b} M(u, f) - \sum_{b=Th(u,d_h)}^{v-1} M(u, b) \quad \text{[Equation 6]}$$

Herein, C(u,v) is a cost map value, M(u,f) is a membership accumulated value from the free space region v to the object boundary region vb, and M(u,b) is a membership accumulated value from an object threshold value (Th(u,$d_h$)) to the end v−1.

The separator 800 serves to separate the foreground and the background by using the computed membership value. That is, the separator 800 serves as the conventional foreground/background separator 40, which segments a boundary value of a height of an object by using the dynamic programming again on the basis of the converted membership cost value and represents the object by defining a "Stixel" by expressing the segmented object as stack-form pixels with equal intervals which are applied to Daimler through the Stixel generator 50.

According to the embodiment of the present invention, a method of separating a background and an object is accelerated by using occupancy grid information according to a prior probability distribution so that an amount of unnecessary computation is reduced and a foreground/background separation method which has a large amount of computation is optimized.

Meanwhile, preferably, the threshold value setter 400 according to the embodiment of the present invention may set the threshold value of the foreground object on the basis of a prior probability information value. As the threshold value setter 400 sets the threshold value of the foreground object on the basis of the prior probability information value, an error in the determination of whether a membership value reaches the threshold value of the foreground object may be reduced.

In addition, the threshold value setter 400 according to the embodiment of the present invention detects the number of object pointers p existing in each grid of the generated probability-based grip map through the occupancy grid map generator 200, calculates a height of an object from the number of the object pointers p, and sets the calculated height of the object as the threshold value of the foreground object.

As such, according to the threshold value setter 400 employed for the embodiment of the present invention, a height of an object is easily detected by detecting the number of object pointers existing in each grid of a probability-based grip map, and the threshold value of the foreground object is set by using the computed height.

Meanwhile, the threshold value setter 400 may set the threshold value of the foreground object to be further provided with an additional corrective value, as shown in Equation 7.

$$Th(u, d_b) = \frac{D(u, d_b)}{G_{\overline{m}_k}(0)} + Th_0 \qquad \text{[Equation 7]}$$

Herein, $Th(u,d_b)$ is a threshold value, and concerns a process of normalizing a value at a corresponding boundary region with $G_{\overline{m}_k}$. $Th_o$ is an additional corrective value. However, the setting of the threshold value according to the present invention is not limited thereto.

As such, the threshold value setter 400 employed for the embodiment of the present invention further includes the additional corrective value in the set threshold value of a foreground object so that an error in foreground object and background separation is reduced.

Meanwhile, the threshold value setter 400 employed for the embodiment of the present invention performs profiling on foreground object values by voting for objects having similar depth information when computing a foreground object membership value from the free space boundary region, detects a maximum value of the profiled foreground object values, and determines that the maximum value is the threshold value of the foreground object.

Figure 3:
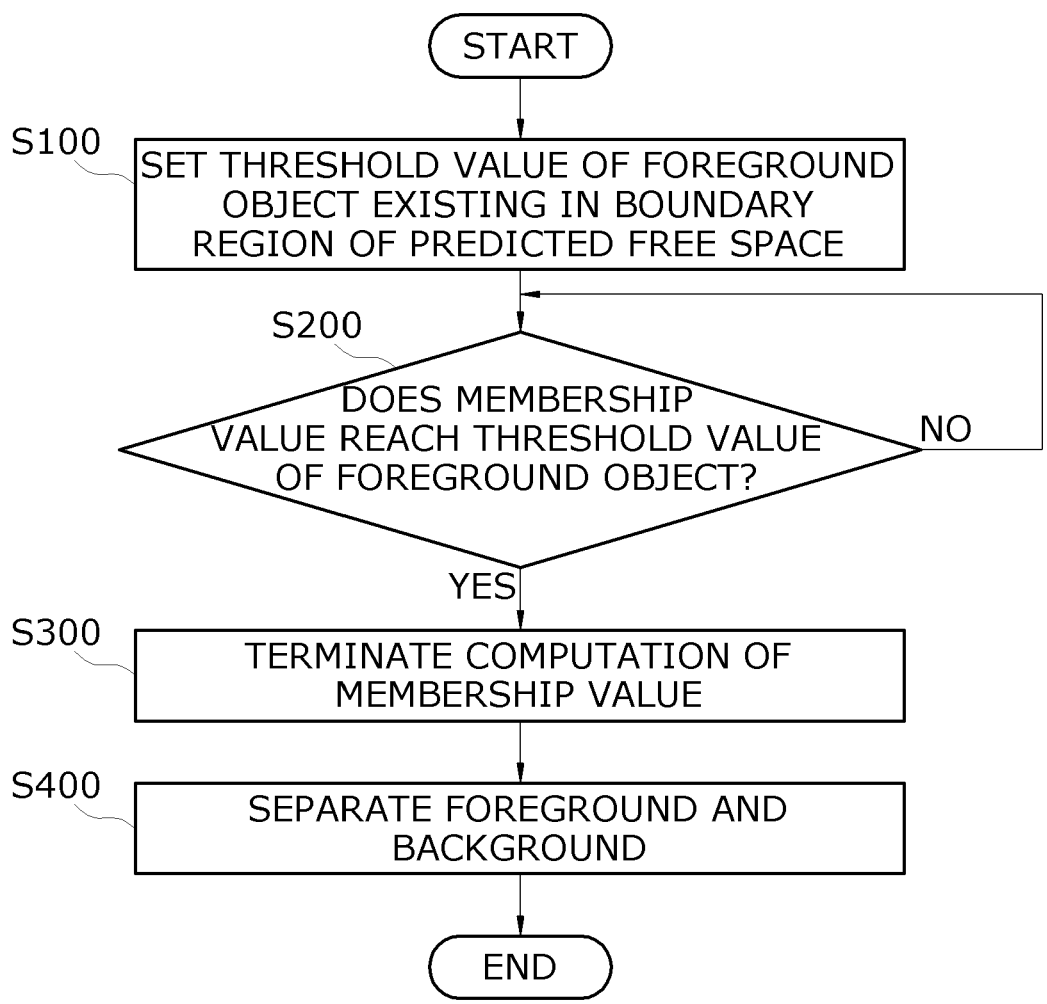
FIG. 3 is a flowchart showing a method for accelerating foreground/background separation in an object detection method using a stereo camera according to an embodiment of the present invention.

FIG. 3 is a flowchart showing a method for accelerating foreground/background separation according to an embodiment of the present invention. Referring to FIG. 3, preferably, the method for accelerating foreground/background separation according to the embodiment of the present invention may be performed by a single processor.

First, a threshold value of a foreground object existing in a free space boundary region of a predicted free space is set (S100). According to the embodiment of the present invention, preferably, the threshold value of the foreground object is set on the basis of a prior probability information value.

Then, it is determined whether a membership value reaches the threshold value of the foreground object while the membership value is computed (S200).

When it is determined that the membership value being computed reaches the threshold value of the foreground object in the determination (YES in operation S200), the computing of the membership value is terminated (S300).

Then, a foreground and a background are separated through the computed membership value (S400).

As such, according to the embodiment of the present invention, the threshold value of the foreground object is set while the foreground object membership value is computed so that a membership value, which is distinguished from a foreground after the threshold value, is not computed, thereby accelerating foreground and background separation.

Preferably, the operation S100 of setting the threshold value in the free space boundary region according to the embodiment of the present invention may be set through the above Equation 7.

In the operation S200 of determining whether the membership value reaches the threshold value of the foreground object while the membership value is computed according to the embodiment of the present invention, conventional membership values are computed and accumulated in the vertical direction, and the accumulation in the vertical direction is stopped by determining whether the membership values reach the set threshold value so that the amount of computation of the membership values is reduced. That is, the above Equation 6 shows an embodiment of an equation of converting a membership value based on the threshold value.

As such, according to the embodiment of the present invention, when a cost map value for a membership is calculated, the need for calculating the cost map value for the membership with respect to M (u,b) after reaching the threshold value of the object is obviated so that an unnecessary amount of computation is reduced and the foreground/background separation method which has a large amount of computation is optimized.

Figure 4:
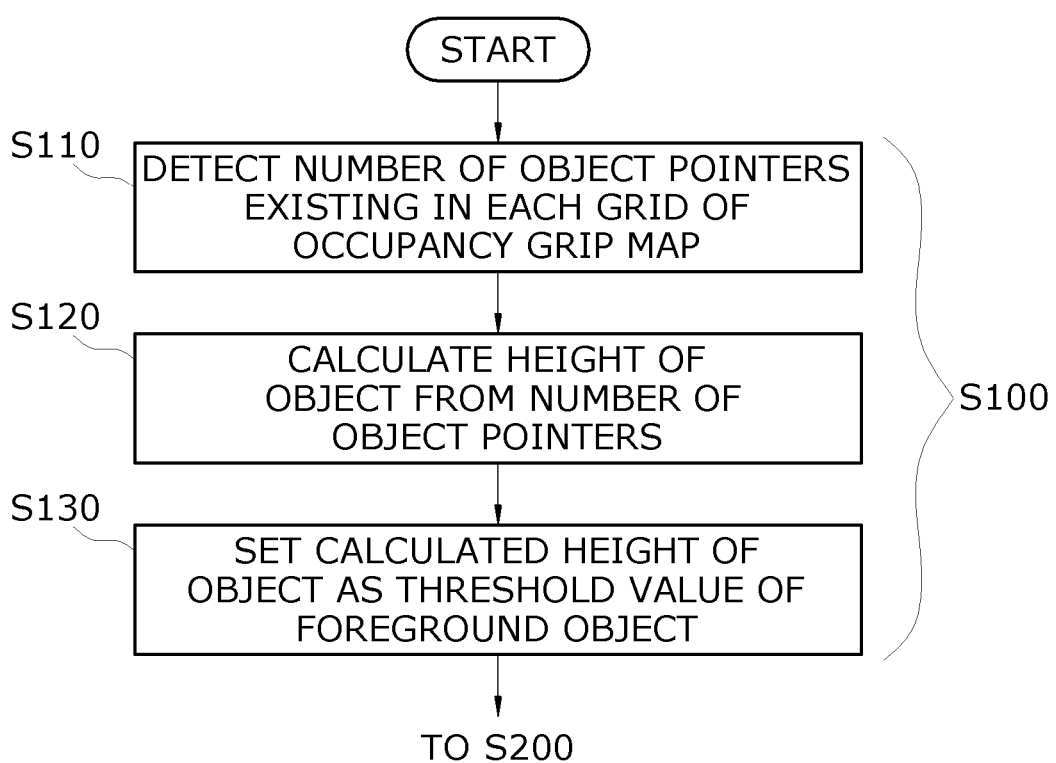
FIG. 4 is a flowchart for explaining how to set a threshold value of a foreground object according to an embodiment of the present invention.

FIG. 4 is a flowchart for explaining how to set a threshold value of a foreground object according to an embodiment of the present invention. Referring to FIG. 4, the setting of the threshold value (a critical value) of the foreground object employed for the embodiment of the present invention includes detecting the number of object pointers existing in each grid of a generated probability-based occupancy grip map (S110).

Then, a height of an object is calculated from the number of the object pointers (S120), and the calculated height of the object is set as the threshold value of the foreground object (S130).

As such, according to the embodiment of the present invention, a height of an object is easily detected by detecting the number of object pointers existing in each grid of a probability-based grip map, and the threshold value of the foreground object is set using the calculated height.

Figure 5:
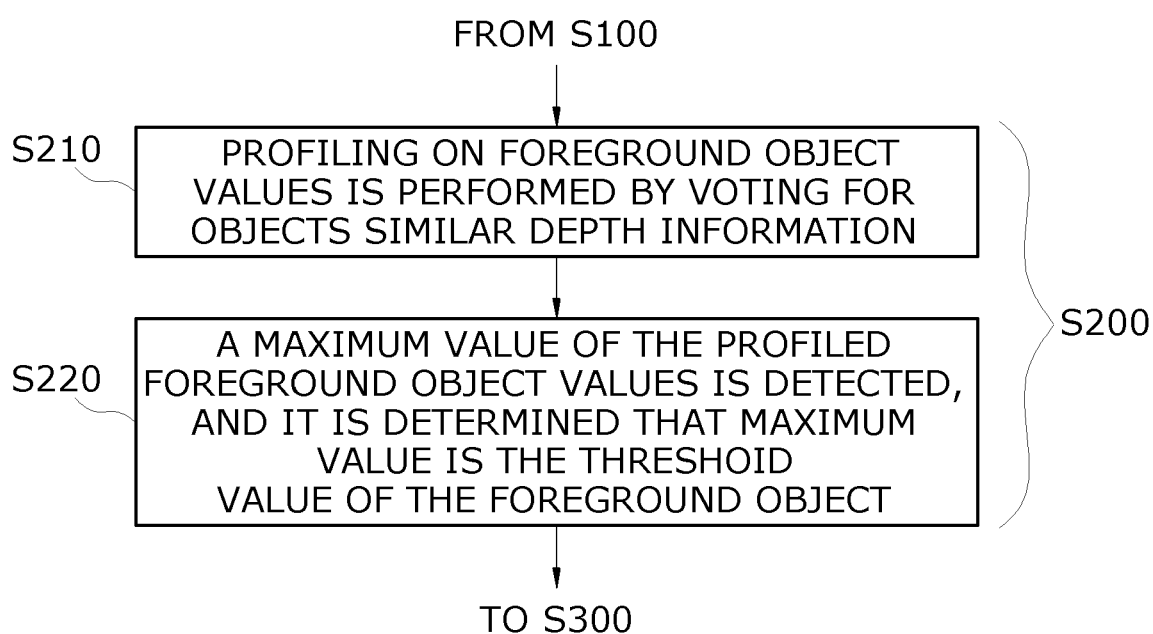
FIG. 5 is another flowchart for explaining how to set a threshold value of a foreground object according to an embodiment of the present invention.

FIG. 5 is another flowchart for explaining how to set a threshold value of a foreground object according to an embodiment of the present invention.

Referring to FIG. 5, In the operation S200 of determining whether the membership value reaches the threshold value of the foreground object during the computation of the membership value according to the embodiment of the present invention, profiling on foreground object values is performed by voting for objects having similar depth information (S210).

A maximum value of the profiled foreground object values is detected, and it is determined that the maximum value is the threshold value of the foreground object (S220).

As should be apparent from the above, an unnecessary amount of computation can be reduced and the foreground/background separation method which has a large amount of computation can be optimized by accelerating a method of separating a background and an object by using occupancy grid information according to a prior probability distribution.

Although a few embodiments of the present invention have been shown and described, the above embodiments are for illustrative purposes only, and it should be appreciated by those skilled in the art that changes and modifications are possible without departing from the scope and sprit of the disclosure. For example, each of the elements illustrated in detail according to the embodiments of the present invention may be implemented in a modified form.

In addition, modifications and applications which are not been illustrated above may be included within the scope which is defined in the claims and their equivalents.

What is claimed is:

1. A method for accelerating foreground/background separation in object detection using a stereo camera when separating a foreground and a background by extracting a depth image through the stereo camera, generating an occupancy grid map on the basis of the depth image, predicting a free space, and computing a membership value, the method comprising:
    setting a threshold value of a foreground object existing in a free space boundary region of the predicted free space, the threshold value used to terminate a computation of the membership value;
    determining whether the membership value reaches the threshold value of the foreground object while the membership value is computed;
    terminating the computing of the membership value when it is determined that the membership value being computed reaches the threshold value of the foreground object in the determining; and
    separating the foreground and the background through the computed membership value.

2. The method of claim 1, wherein in the setting of the threshold value of the foreground object, the threshold value of the foreground object is set on the basis of a prior probability information value.

3. The method of claim 2, wherein the setting of the threshold value of the foreground object includes:
    detecting a number of object pointers existing in each grid of a generated probability-based grid map;
    calculating a height of an object from the number of the object pointers; and
    setting the calculated height of the object as the threshold value of the foreground object.

4. The method of claim 3, wherein in the setting of the threshold value of the foreground object, the set threshold value of the foreground object is further provided with an additional corrective value.

5. The method of claim 2, further comprising, when the membership value of the object is computed from the free space boundary region, performing profiling on foreground object values by voting for objects having similar depth information; and
    detecting a maximum value of the profiled foreground object values and determining the maximum value to be the threshold value of the foreground object.

6. The method of claim 5, further comprising:
    determining an existence of a portion in a predetermined section in which profiled foreground object value increases again;
    determining that the detected foreground object value is the maximum value when it is determined that a section in which the profiled foreground object value increases again does not exist in the determining, and setting the maximum value as the threshold value of the foreground object.

7. An apparatus for accelerating foreground/background separation in object detection, the apparatus comprising:
    a pair of stereo cameras configured to capture an image;
    an occupancy grid map generator configured to extract a depth image from the image captured through the stereo cameras and generate an occupancy grid map on the basis of the depth image;
    a free space processor configured to predict a free space from the generated occupancy grid map;
    a threshold value setter configured to set a threshold value of a foreground object which is used to terminate a computation of a membership value;
    a membership computer configured to compute the membership value of the image;
    a membership determiner configured to determine whether the membership value reaches the threshold value of the foreground object while the membership value is computed;
    a membership controller configured to terminate the computation of the membership value when it is determined that the membership value being computed reaches the threshold value of the foreground object; and
    a separator configured to separate a foreground and a background through the computed membership value.

8. The apparatus of claim 7, wherein the threshold value setter sets the threshold value of the foreground object on the basis of a prior probability information value.

9. The apparatus of claim 8, wherein the threshold value setter is configured to:
    detect a number of object pointers existing in each grid of a generated probability-based grid map,
    calculate a height of an object from the number of the object pointers and set the calculated height of the object as the threshold value of the foreground object.

10. The apparatus of claim 9, wherein the threshold value setter sets the threshold value of the foreground object to be further provided with an additional corrective value.

11. The apparatus of claim 7, wherein the threshold value setter is configured to, when the membership value of the foreground object is computed from a free space boundary region, perform profiling on foreground object values by voting for objects having similar depth information, detect a maximum value of the profiled foreground object values, and determine the maximum value to be the threshold value of the foreground object.

12. The apparatus of claim 11, wherein the threshold value setter is configured to determine an existence of a portion in a predetermined section in which the profiled foreground object value increases again; and
    determine that the detected foreground object value is the maximum value when it is determined that a section in which the profiled foreground object value increases again does not exist as a result of the determination, and set the maximum value as the threshold value of the foreground object.

* * * * *